United States Patent [19]

McCartney

[11] Patent Number: 4,910,698
[45] Date of Patent: Mar. 20, 1990

[54] SINE WAVE GENERATOR USING A CORDIC ALGORITHM

[75] Inventor: Andrew McCartney, Los Gatos, Calif.

[73] Assignee: Schlumberger Technologies, Inc., San Jose, Calif.

[21] Appl. No.: 284,775

[22] Filed: Dec. 12, 1988

Related U.S. Application Data

[63] Continuation of Ser. No. 933,456, Nov. 21, 1986, abandoned.

[51] Int. Cl.$^4$ .............................................. G06F 15/31
[52] U.S. Cl. ...................................................... 364/721
[58] Field of Search .................... 364/721, 718; 328/14

[56] References Cited

U.S. PATENT DOCUMENTS

| | | | |
|---|---|---|---|
| 3,766,370 | 10/1973 | Walther | 364/721 |
| 3,896,299 | 7/1975 | Rhodes | 364/729 |
| 4,142,245 | 2/1979 | Baron | 364/721 |
| 4,476,536 | 10/1984 | Jones | 364/721 |
| 4,577,287 | 3/1986 | Chrin | 364/721 |

OTHER PUBLICATIONS

J. E. Volder, "The Cordic Trigonometric Computing Technique," *IRE Transactions on Electronic Computers* (Sep. 1959) pp. 330-334.
J. S. Walther, "A Unified Algorithm for Elementary Functions," *Spring Joint Computer Conference*, 1971; pp. 379-385.

*Primary Examiner*—David H. Malzahn
*Attorney, Agent, or Firm*—Townsend and Townsend

[57] ABSTRACT

A circuit for generating successive points on a sine wave using the Coordinate Rotational Digital Computer (CORDIC) algorithm. An angle memory and an amplitude memory store respective angle and amplitude values from which a CORDIC logic processor calculates a point on a sine wave. A frequency memory stores an increment value unique to the frequency of the sine wave to be formed, and an arithmetic logic unit adds the increment value to the stored angle value after the point on the sine wave is calculated. The CORDIC logic processor then calculates the next point on the sine wave from the incremented angle value. A digital-to-analog converter may be used to provide an analog output signal.

For generating multi-tone signals, the angle, amplitude and frequency memories are configured to store a plurality of angle, amplitude and increment values, and an address memory is connected to each memory for simultaneously addressing them. A periodic counter is connected to the address memory and cyclically selects the addresses in the address memory to be used for addressing the angle, amplitude and frequency memories. The multi-tone signals are then produced by serially time-multiplexing the CORDIC processor among the frequencies.

16 Claims, 5 Drawing Sheets

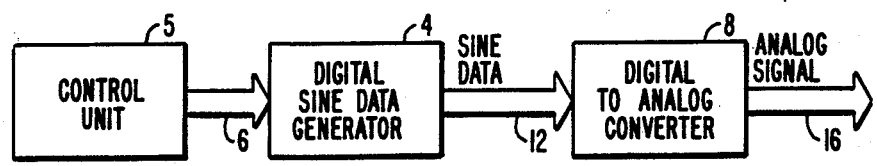
FIG._1.
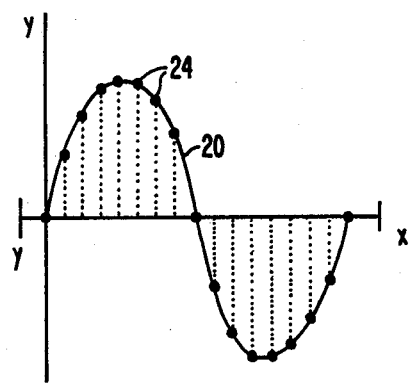
FIG._2.
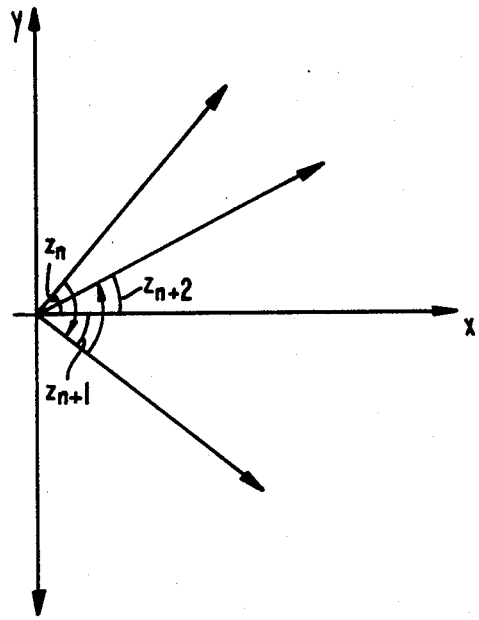
FIG._3.

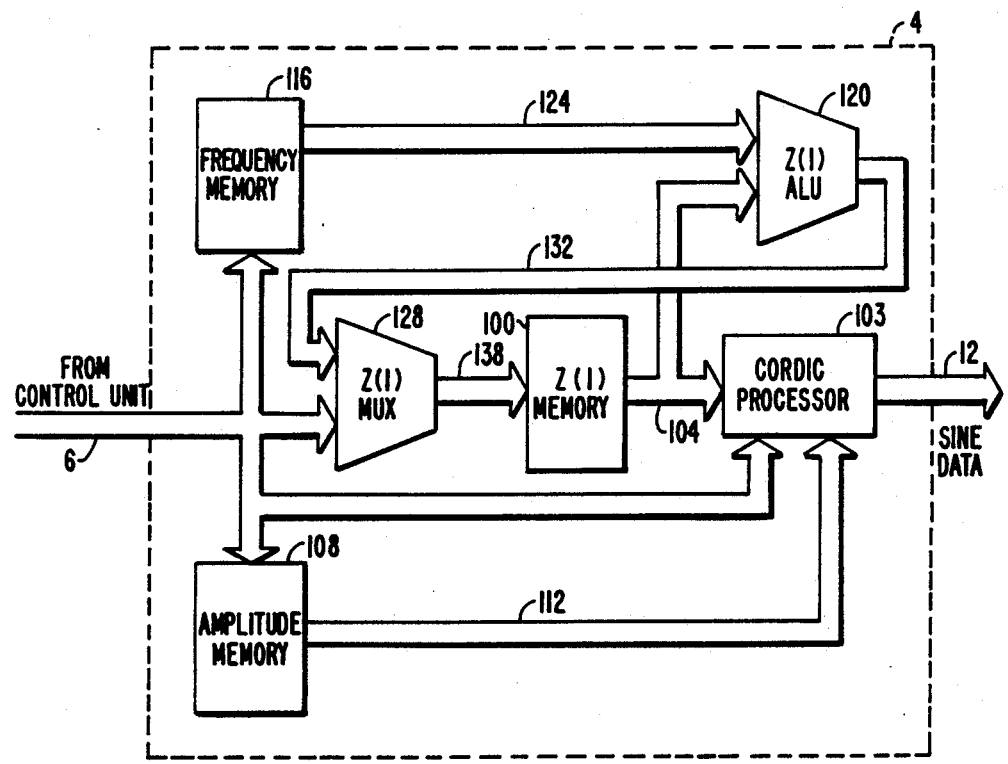
FIG.—4.

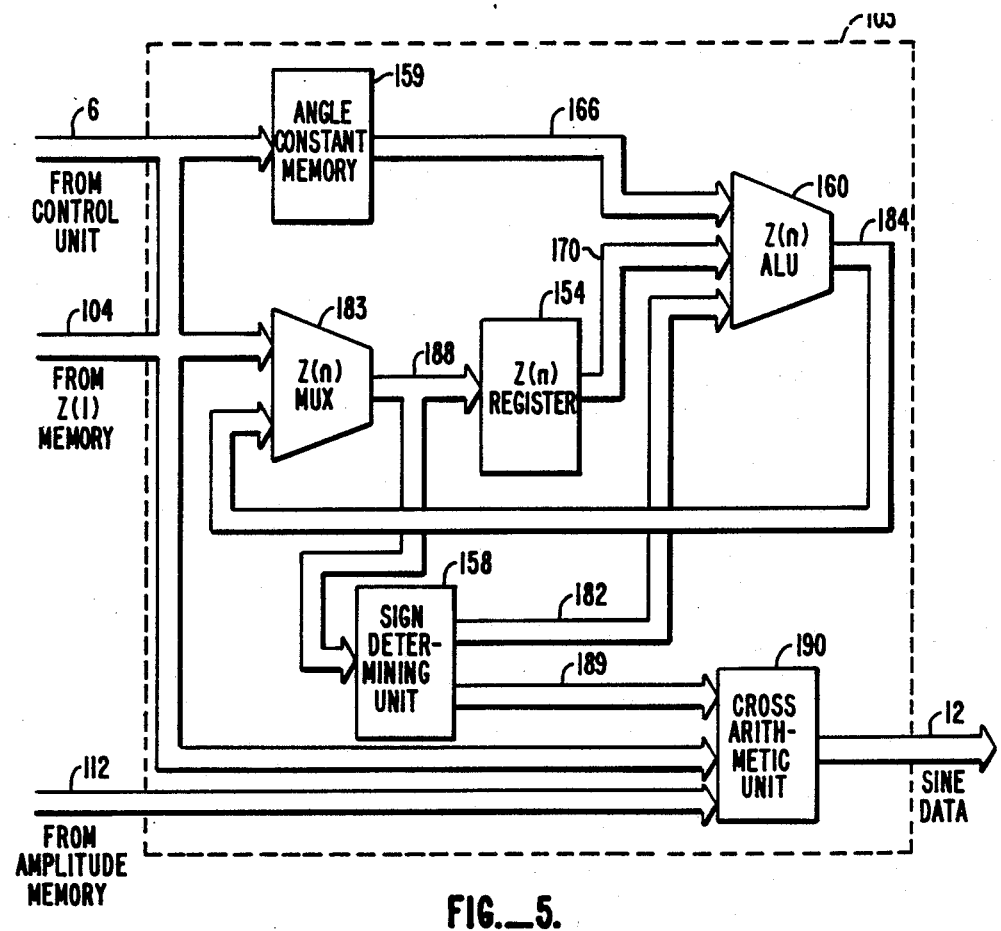
FIG._5.

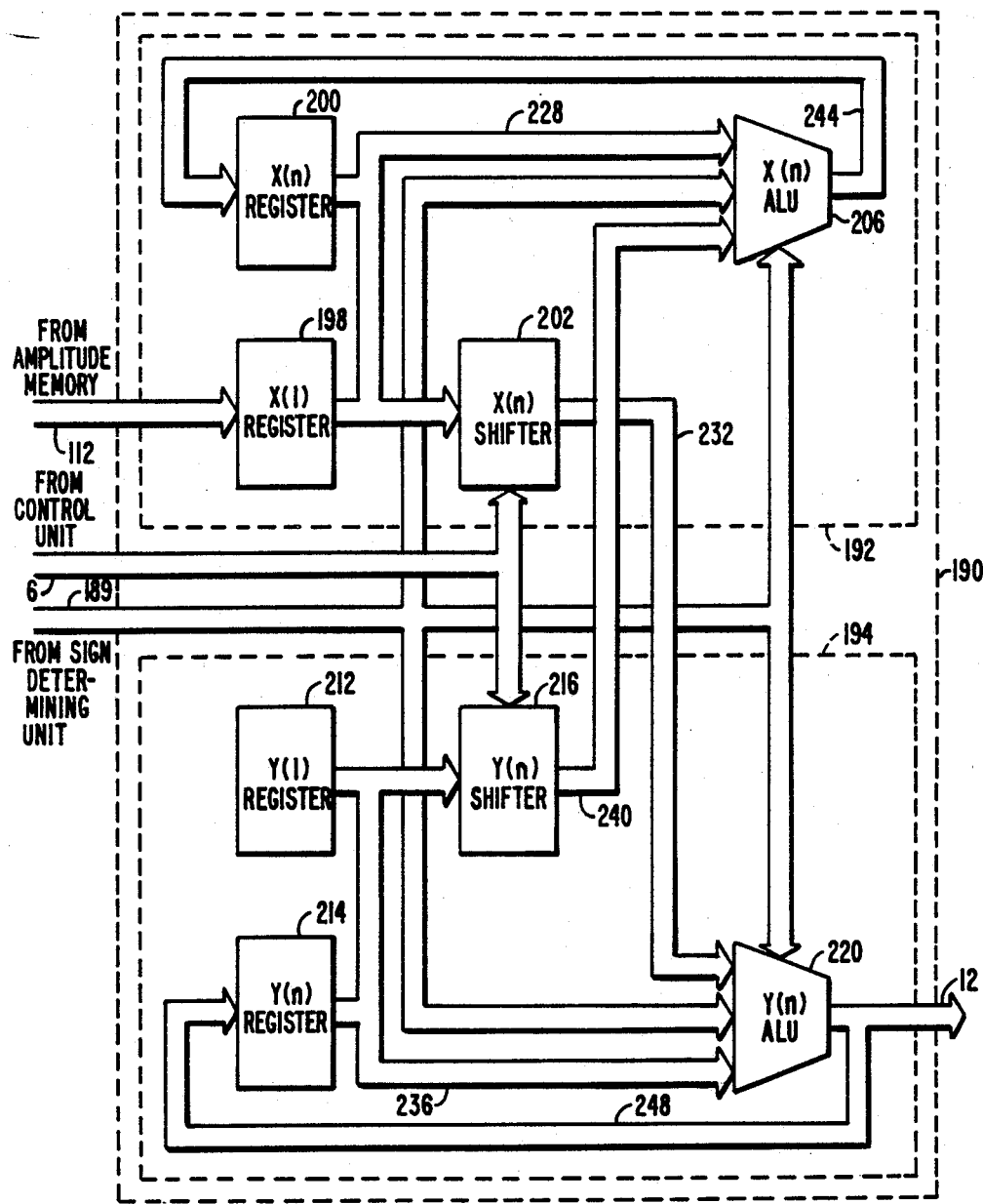
FIG._6.

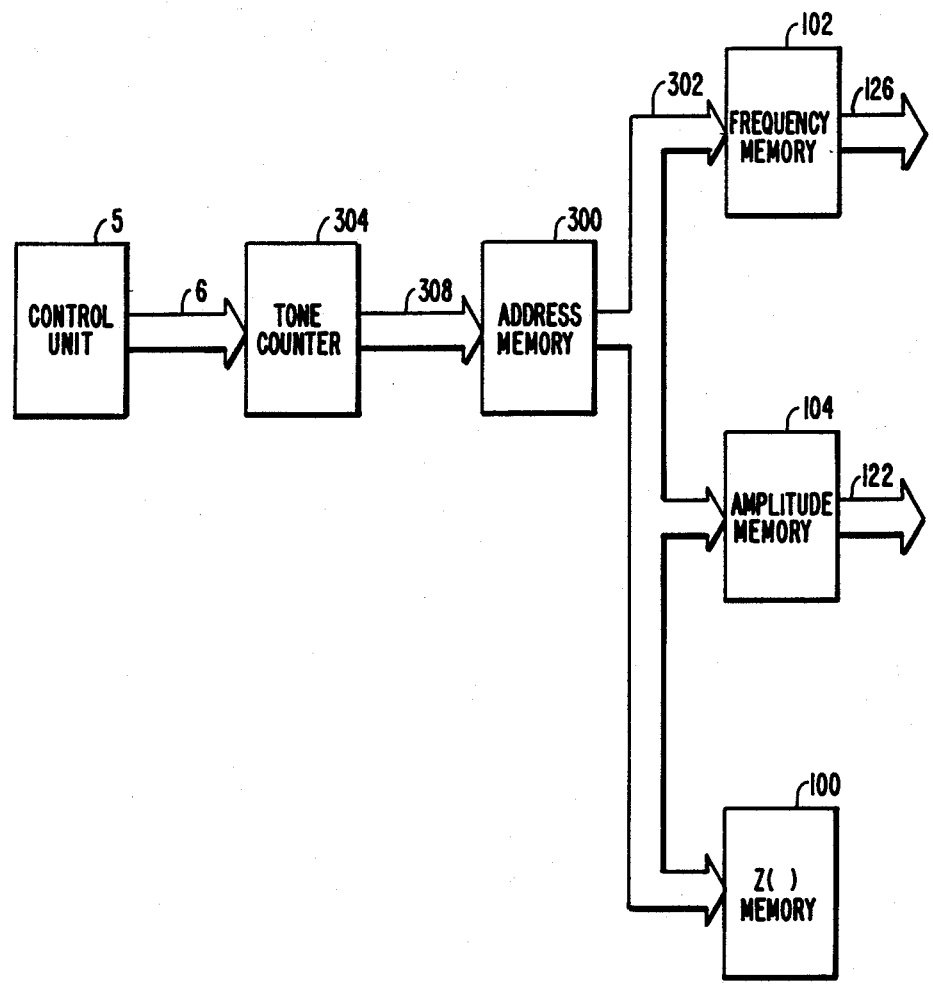
FIG._7.

SINE WAVE GENERATOR USING A CORDIC ALGORITHM

This is a continuation of application Ser. No. 933,456, filed Nov. 21, 1986, now abandoned.

BACKGROUND OF THE INVENTION

The invention relates generally to sine wave generators and, more particularly, to a sine wave generator capable of producing single or multi-tone analog signals comprised of sine waves programmable in frequency, amplitude, and initial phase.

Sine wave generators are used for many different applications, e.g., testing the AC characteristics of integrated circuits such as operational amplifiers and active and passive filters. However, conventional generators typically form sine waves using analog components, and such components ordinarily must be controlled manually. Accordingly, these generators lack the flexibility required for modern digital data processing applications.

To take advantage of the processing capability and flexibility of modern digital computers, programmable sine wave generators have been devised. In these prior art systems, discrete points on a sine wave are generated in digital form by a microprocessor or an array processor and communicated to a digital-to-analog converter wherein an analog signal is formed from the digital data. The programming for these generators is implemented in either software or microcode, and the algorithms frequently use table look-up routines to generate the digital data. Because of the software based nature of such generators and the time required for the code to execute, the process does not operate fast enough for real time applications. Consequently, those prior art systems must use a memory to store a pre-generated representation of a sine wave, and the data stored in the memory then is clocked out to a digital-to-analog converter at a prescribed rate. If a low distortion sine wave is desired then a substantial amount of memory must be provided for storing enough data points (particularly at higher frequencies). To vary the output frequency of the resulting signal, the output clock is varied by a phase locked loop circuit, with the concomitant phase jitter problems. Alternatively the output frequency is varied by dividing a very high frequency clock, but the high frequency clock often interferes with the analog circuitry.

SUMMARY OF THE INVENTION

The present invention provides a real time processor capable of producing a single- or multi-tone analog signal comprised of sine waves programmable in frequency, amplitude, and initial phase. The processor employs the COordinate Rotation DIgital Computer (CORDIC) algorithm, developed by Jack E. Volder in 1959, and the hardware is designed specifically to directly implement the CORDIC algorithm without the use of software, microcode, or table look-up routines.

In one embodiment of the present invention, an angle memory and an amplitude memory store respective angle and amplitude values from which a CORDIC logic processor calculates a point on a sine wave. A frequency memory stores an increment value unique to the frequency of the sine wave to be formed, and an arithmetic logic unit adds the increment value to the stored angle value after the point on the sine wave is calculated. The CORDIC logic processor then calculates the next point on the sine wave from the incremented angle value. The process continues for successive incremented angle values, and the resulting data, which represents successive points on a sine wave, are communicated to a digital-to-analog converter for conversion into the analog signal.

In another embodiment of the invention for generating multi-tone signals, the angle, amplitude and frequency memories are configured to store a plurality of angle, amplitude and increment values (one for each frequency desired), and the multi-tone signals are produced by serially time-multiplexing the CORDIC algorithm among the frequencies. In this embodiment, an address memory is connected to the angle, amplitude and frequency memories, and a periodic counter is connected to the address memory for cyclically selecting the addresses in the address memory to be used for addressing them. In operation, a point is calculated from the angle value for tone one, the angle for that tone is incremented by a corresponding increment value in the frequency memory, and the incremented angle is stored in the angle memory. The CORDIC processor then calculates a point from the angle value for tone two, the angle for that tone is incremented by a corresponding increment value in the frequency memory, and the incremented angle is stored in the angle memory. This continues for successive tones until the first point for each tone has been calculated. The procedure is then repeated for the second, third, fourth, . . . , etc. points of each tone.

BRIEF DESCRIPTION OF THE DRAWINGS

FIG. 1 is a conceptual block diagram of a sine wave generator according to the present invention.

FIG. 2 is a diagram of a sine wave illustrating the sine data used to generate it.

FIG. 3 is a diagram illustrating the rotation of X and Y coordinates according to the CORDIC algorithm.

FIG. 4 is a block diagram of the digital sine data generator of FIG. 1.

FIG. 5 is a block diagram of the CORDIC processor of FIG. 4.

FIG. 6 is a block diagram of the cross-arithmetic unit of FIG. 5.

FIG. 7 is a block diagram of an alternate embodiment of the digital sine data generator of FIG. 1.

DETAILED DESCRIPTION OF THE PREFERRED EMBODIMENT

FIG. 1 is a conceptual block diagram of a digital sine data generator according to the present invention. As shown, a digital sine data generator 4 calculates digital sine data in accordance with information received from a control unit 5 over a control bus 6, and generator 4 communicates the sine data to a digital-to-analog converter 8 over a sine data bus 12. The digital-to-analog converter 8 then forms an analog signal from the digital sine data and communicates the analog signal to other parts of the system over a bus 16.

FIG. 2 is a diagram of a sine wave 20 illustrating how it may be viewed as consisting of a series of digital data points 24. Digital sine wave generator 4 calculates each point 24 of sine wave 20, and the value of each point 24 is communicated to digital-to-analog converter 8. Converter 8 forms analog sine wave 20 from the digital data supplied.

To minimize the processing time for each point relative to that required by known programmable sine wave generators, the present invention employs the COordinate Rotation DIgital Computer (CORDIC) algorithm developed by Jack E. Volder in 1959. The CORDIC algorithm may be used for generating a range of algebraic and trigonometric functions through rotational techniques, and it is based on the following three equations:

$$X(n+1) = X(n) \pm Y(n) \times 2^{-(n-2)}$$

$$Y(n+1) = Y(n) \mp X(n) \times 2^{-(n-2)}$$

$$Z(n+1) = Z(n) \pm ARCTAN(2^{-(n-2)})$$

where X and Y are a coordinate pair, Z is an angle, and n is an integer greater than zero. The total number of iterations N is determined by the accuracy desired. In the preferred embodiment N=20.

FIG. 3 is a diagram illustrating the rotation of the angle Z according to the CORDIC algorithm. As shown therein, an angle $Z(n)$ is supplied to the system and then the CORDIC logic processor either adds or subtracts a series of known angle values so that the value of $Z(n)$ is driven to 0. The decision of whether to add or subtract the next angle in the series is based on the sign of $Z(n)$, i.e., if $Z(n)$ is negative, then the next angle is added to $Z(n)$ to drive it closer to 0. If $Z(n)$ is positive, then the first angle is subtracted from $Z(n)$ causing the value of $Z(n+1)$ to be negative. Accordingly, the next angle is added to $Z(n+1)$ causing the value of $Z(n+2)$ to be positive. After each operation the value of Z is driven closer to zero. The (X,Y) coordinate pair is put through the same series of angular rotations as $Z(n)$ but with opposite sign (i.e., if 90° is subtracted from $Z(n)$, then (X,Y) is rotated +90°).

If the above equations are repeated for N iterations, the result is:

$$X(N) = K(X(1) \cos(A) + Y(1) \sin(A))$$

$$Y(N) = K(Y(1) \cos(A) + X(1) \sin(A))$$

$$Z(N) = Z(1) + A.$$

In the preferred embodiments, $K = (1+2^{-0})^{0.5} \times (1+2^{-2})^{0.5} \times \ldots \times (1+2^{-2(N-2)})^{0.5}$ and $A = 90° \pm ARCTAN(2^0) \pm ARCTAN(2^1) \pm \ldots \pm ARCTAN(2^{-(N-2)})$ (comprising the series of known angle values). If the initial values are chosen to be $X(1) = 1/K$, $Y(1) = 0$ and $Z(1) = Z(1)$, the results will be $X(N) = \cos(Z(1))$, $Y(N) = \sin(Z(1))$, and $Z(N) = 0$. The value of Y may then be communicated to an appropriate digital-to-analog converter for forming the analog sine wave.

FIG. 4 is a more detailed block diagram of the digital sine data generator 4 illustrated in FIG. 1. As shown in FIG. 4, digital sine data generator 4 includes a Z(1) memory 100 for storing Z(1) values and a CORDIC processor 103 for calculating sine (Z(1)) from the Z(1) values received over a Z(1) bus 104. CORDIC processor 103 also receives amplitude data stored in an amplitude memory 108 over an amplitude bus 112 for calculating the amplitude of the sine wave.

A frequency memory 116 stores increment values for incrementing Z(1), and a Z(1) ALU 120 adds the increment value received over a frequency bus 124 to the value of Z(1) received over Z(1) bus 104 after each sine value is calculated by CORDIC processor 103. Z(1) memory 100 is preferably configured so that the binary value of Z contained therein undergoes a sign transition at 180° so that subsequent additions of the increment value drive the value of Z(1) back to zero. The increment value depends on the desired frequency and the rate at which the data points are clocked out to digital to analog converter 8. The incremental value is calculated as follows:

Increment value = (Desired frequency × 360 degrees)/output data rate.

A Z(1) multiplexer 128 selectively communicates either the incremented Z(1) value received over a Z(1) ALU output bus 132 or the initial Z(1) value received over control bus 6 to Z(1) memory 100 over a Z(1) input bus 138. CORDIC processor 103, frequency memory 105, and amplitude memory 108 also are connected to control bus 6 for receiving initial data and control information therefrom.

FIG. 5 is a more detailed block diagram of CORDIC processor 103. As shown therein, CORDIC processor 103 includes a Z(n) register 154 for storing the transformed values of Z(1), i.e., Z(n) during processing, a sign determining unit 158 for indicating the sign of Z(n), an angle constant memory 159 for storing angle constant values of $ARCTAN\ 2^{-(n-2)}$ (received over control bus 6), and a Z(n) ALU 160. Sign-determining unit 158 may comprise a D-type flip-flop having its D input terminal connected for receiving the high order bit of the Z(n) input value and its Q and $\overline{Q}$ output terminals connected for indicating whether the value is positive or negative. Z(n) ALU 160 adds or subtracts an angle constant value received over an angle constant bus 166 to or from the current value of Z(n) received over a Z(n) bus 170 in accordance with the sign of Z(n) received over a determinor-ALU bus 182. The ALU 160 communicates the modified valued of Z(n) to a Z(n) multiplexer 183 over a Z(n) ALU output bus 184. Z(n) multiplexer 183 selectively sends either the Z(1) value received over Z(1) bus 104 or the current Z(n) value received over Z(n) ALU output bus 184 to Z(n) register 154 over a Z(n) input bus 188. Z(n) input bus 188 also supplies the value of Z(n) to sign-determining unit 158 for determining its sign, which also communicates the sign of Z(n) over a determinor-CAU bus 189 to a cross-arithmetic unit 190. Unit 190 processes the X and Y coordinates in accordance with the equations discussed above using the parameters received over control bus 6 and amplitude bus 112.

FIG. 6 is a more detailed block diagram of cross-arithmetic unit 190. Cross-arithmetic unit 190 comprises an X arithmetic section 192 for performing the operation $X(n+1) = X(n) \pm Y(n) \times 2^{-(n-2)}$ and a Y arithmetic section 194 for performing the operations $Y(n+1) = Y(n) \mp [X(n) \times 2^{-(n-2)}]$. X arithmetic section 192 comprises an X(1) register 198 for storing an initial X(1) value received over amplitude bus 112, an X(n) register 200 for storing successive X(n) values, an X(n) shifter 202 for performing the multiplication $X(n) \times 2^{-(n-2)}$ by shifting X(n) by n−2 bits, and an X(n) ALU 206 for performing the final operation $X(n+1) = X(n) \pm [Y(n) \times 2^{-(n-2)}]$. Similarly, Y arithmetic section 194 comprises a Y(1) register 212 for storing an initial Y(0) value, a Y(n) register 214 for storing successive Y(n) values, a Y(n) shifter 216 for performing the operation $Y(n) \times 2^{-(n-2)}$ by shifting Y(n) by n−2 bits, and a Y(n) ALU 220 for performing the final operation $Y(n+1)=Y(n)\mp[X(n)\times 2^{-(n-2)}]$. In this embodiment X(n) shifter 202 and Y(n) shifter 216 are inhibited when n=1 for reasons discussed below.

X(n) shifter 202 and X(n) ALU 206 receive either the initial X(0) value or the current X(n) value over an X(n) input bus 228. X(n) shifter 202 shifts the value of X(n) so received in accordance with signals received over control bus 6 and communicates the result to Y(n) ALU 220 over an X(n) shift bus 232. Y(n) shifter 216 and Y(n) ALU 220 receive either the initial Y(0) value on the current Y(n) value over a Y(n) input bus 236. Y(n) shifter 216 shifts the value of Y so received in accordance with signals received over control bus 6 and communicates the result to X(n)-ALU 206 over a Y(n) shift bus 240.

X-ALU 206 performs the final X(n) cross-addition in accordance with the sign of the Z(n) input received over determinor-CAU bus 189 and communicates the result to X(n) register 200 over an X(n) ALU output bus 244. Similarly, Y(n)-ALU 220 performs the final Y(n) cross-addition in accordance with the sign of the Z(n) input received over the determinor-CAU bus 189 and communicates the result to Y(n) register 224 over a Y(n) AlU output bus 248. At the end of N iterations, the output from Y(n) ALU 220 comprises the sine value for the original Z(1) input value and is communicated to sine data bus 12.

Operation

In operation, angle constant memory 159 is loaded with the angle constant values to be used in the process (in this embodiment preferably. 90°, ARCTAN $2^0$, ARCTAN $2^{-1}$, ..., ARCTAN $2^{-18}$ in this embodiment). A value for Z(1) (e.g., 0) is supplied to Z(1) multiplexer 128 (and hence Z(1) memory 100), frequency memory 116 is provided with an increment value for Z(1) representing the desired frequency, and amplitude memory 108 is provided with the desired amplitude value (e.g., 1/K defined earlier). The amplitude value in amplitude memory 108 is communicated to X(1) register 198, and a value of 0 is provided to Y(1) register 212 (preferably by connecting the Y(1) register input terminals to force a zero value at its outputs).

The Z(1) input value is supplied to CORDIC processor 103 wherein the sine value for that angle is calculated and placed on sine data bus 12. Then, Z(1) ALU 120 adds the increment value from frequency memory 116 to the present value in Z(1) memory 100 and communicates the incremented angle to Z(1) multiplexer 128 over Z(1) ALU bus 132. Z(1) multiplexer 110 in turn communicates the incremented angle to Z(1) memory 100. The incremented angle in Z(1) memory 100 is used by CORDIC processor 103 to calculate a new sine value. The process continues for each successive point on the sine wave. The sine data communicated over sine data bus 12 then is converted into an analog signal by digital-to-analog converter 8 (FIG. 1).

When the Z(1) value is supplied to CORDIC processor 103, Z(n) ALU 160 adds 90° (the first value in angle constant memory 159) to the initial Z(1) value and communicates the result to Z(n) register 154 as Z(2). Z(2) is then incremented by Z(n) ALU 160 with the next value in angle constant memory 159 (ARCTAN $2^0$), and the sequence continues until the value of ARCTAN $2^{-18}$ is added to or subtracted from Z(20) by Z(n) ALU 160 to result in a zero value for Z.

For each operation on Z(n), cross-arithmetic unit 190 performs the cross-additions on the X and Y coordinates. Since the first iteration of the algorithm in this embodiment is always a rotation of either ±90°, X(2) and Y(2) become 0 and $\mp X(1)$, respectively. This is accomplished by inhibiting the operation of X(n) shifter 202 and Y(n) shifter 216 by appropriate signals received over control bus 6. The unshifted value of X(1) then is communicated to Y(n) ALU 220 over Y(n) shift bus 232, and Y(n) ALU 220 adds or subtracts the value of X(1) to the value of Y(1) (i.e., 0) to produce Y(2) in accordance with the sign information received over determinor-CAU bus 189. Simultaneously, the inputs to X(n) ALU 206 may be set to force a zero at its output, and this value is communicated to X(n) register 208 as X(2).

X(2) and Y(2) then are added to the values in X(n) shifter 202 and Y(n) shifter 216, respectively, to produce X(3) and Y(3), respectively. The cycle continues until X(20) and Y(20) are added to the respective values of X(n) shifter 202 (X(20)×$2^{-18}$) and Y(n) shifter 216 (Y(20)×$2^{-18}$). Once complete, the resulting value of Y is communicated to sine data bus 12 by Y(n) ALU 220.

CONCLUSION AND ALTERNATIVE EMBODIMENTS

While the above is a complete description of a preferred embodiment of the present invention various modifications may be employed. For example, the rapid processing capabilities of CORDIC processor 103 also may be used to generate multi-tone signals if sine data generator 4 is modified as shown in FIG. 7. In this embodiment, frequency memory 102 stores a plurality of increment angle values, amplitude memory 104 stores a plurality of amplitude values, and Z(1) memory 100 stores a plurality of Z(1) values. Each value in each memory corresponds to a particular frequency. An address memory 300 stores a plurality of addresses for selecting, through an address-memory bus 302, corresponding increment angle, amplitude and Z(1) values in frequency memory 102, amplitude memory 104, and Z(1) memory 100. A periodic tone counter 304 counts clock pulses from control unit 5 received over control bus 6 and communicates the pulse count to address memory 300 over a tone-address bus 308. Because the pulse count value is used to access address memory 300, tone counter 304 cyclically addresses address memory 300. Address memory 300 in turn cyclically addresses Z(1) memory 100, frequency memory 102 and amplitude memory 104 for providing successive Z(1) increment angle and amplitude values to CORDIC processor 103.

Multi-tone signals then may be generated by time multiplexing CORDIC processor 103 among the different Z(1) values and processing each Z(1) value with its associated increment angle and amplitude values. That is, a first point is calculated from Z(1) for a first tone. Z(1) for that tone is incremented by a corresponding increment angle value in the frequency memory, and the incremented Z(1) is stored in Z(1) memory 100. The CORDIC processor then calculates a first point from the Z(1) value representing a second tone. Z(1) for that tone is incremented by a corresponding increment value in the frequency memory, and the incremented Z(1) is stored in Z(1) memory 100. This continues for successive tones until the first point for each tone has been calculated. The procedure is then repeated for the second, third, fourth, ..., etc. points for each tone.

Flexibility of the system may be enhanced further by having address memory 300 address only a subset of available locations in Z(1) memory 100, frequency memory 102 and amplitude memory 104. In this configuration the unused portions of each memory store optional angle, increment value and amplitude values. These optional values may be addressed during processing by writing an address of the optional values to address memory 300 at the desired time. Consequently, the description should not be used to limit the scope of the invention, which is set out in the claims.

I claim:

1. A circuit for generating succesive points on a sine wave comprising:
   an angle memory for storing a plurality of angle values at addresses therein;
   CORDIC logic means, connected to the angle memory, for calculating a sine value from a selected angle value from the angle memory;
   an increment angle memory for storing a plurality of increment angle values for the selected angle value at addresses therein;
   incrementing means, connected to the angle memory and to the increment angle memory, for successively adding a selected increment angle value from the increment angle memory to the selected angle value and for providing each incremented angle value to the CORDIC logic means for calculating successive points on a sive wave therefrom; and
   addressing means, connected to the increment angle memory to the angle memory, for selecting an increment angle value and an angle value to be used for each sine value calculation.

2. The circuit according to claim 1 wherein the addressing means comprises:
   an address memory, connected to the increment angle memory and to the angle memory, for selecting an increment angle value and an angle value to be used for each sine value calculation; and
   a periodic counter, connected to the address memory and to the source of clock pulses, for counting the pulses and for cyclically selecting addresses in the address memory to be communicated to the increment angle memory and to the angle memory.

3. A circuit for generating successive points on a sine wave comprising:
   angle storing means for storing an angle value;
   CORDIC logic means, connected to the angle storing means, for calculating a sine value from the angle value, the CORDIC logic means comprising:
   sign determining means, connected to the angle storing means, for determining the algebraic sign of the angle value;
   angle constant storing means for storing a plurality of angle constant values;
   angle arithmetic means, connected to the angle constant means, to the angle storing means, and to the sign determining means, for performing N arithmetic operations on the angle value, for any integer N greater than zero, each operation comprising:
   (i) adding an angle constant value to the angle value if the angle value is negative; or
   (ii) subtracting the angle constant value from the angle value if the angle value is positive;
   wherein the result of each arithmetic operation is the angle value for the next arithmetic operation, and the angle constant values are chosen so that the angle value after the N arithmetic operations is substantially equal to zero;
   X-storing means for storing a value of an X-coordinate (X);
   Y-storing means for storing a value of a Y-coordinate (Y); and
   X/Y-arithmetic means, connected to the X storing means, to the Y storing means and to the sign determining means, for performing, for each arithmetic operation on the angle value, a cross-arithmetic operation with an X-coordinate (X) value and a Y-coordinate (Y) value;
   increment angle storing means for storing an increment value for the angle value; and
   incrementing means, connected to the angle storing means and to the increment angle storing means, for successively adding the increment value to the angle value after each sine value is calculated and for providing each incremented angle value to the CORDIC logic means for calculating successive points on a sine wave therefrom.

4. The circuit according to claim 3 wherein the angle storing means comprises a register for storing a binary representation of the angle value, and wherein the sign determining means comprises a flip-flop coupled to the register for receiving the most significant bit of the angle value.

5. The circuit according to claim 3 wherein the cross-arithmetic operation comprises:
   A. when the angle value is negative:
   (i) $X(n+1) = X(n) + [Y(n) \times 2^{-(n-2)}]$ and
   (ii) $Y(n+1) = Y(n) - [X(n) \times 2^{-(n-2)}]$ or
   B. when the angle value is positive:
   (iii) $X(n+1) = X(n) - [Y(n) \times 2^{-(n-2)}]$ and
   (iv) $Y(n+1) = Y(n) + [X(n) \times 2^{-(n-2)}]$ wherein n is an integer, $0 < n \leq N$.

6. The circuit according to claim 5 wherein $X(1)$ equals a real number greater than zero and $Y(1)$ equals zero.

7. The circuit according to claim 6 further comprising:
   amplitude storing means, connected to the cross-arithmetic means, for storing an amplitude value used for calculating an amplitude of the sine wave.

8. The circuit according to claim 7 wherein the amplitude storing means is connected to the X-storing means and the real number is a value from the amplitude storing means.

9. The circuit according to claim 8 wherein the cross-arithmetic means includes:
   an X-shift means, connected to the X-storing means, for implementing the equation $X(n) \times 2^{-(n-2)}$ by shifting respective bits of a binary representation of $X(n)$; and
   a Y-shift means connected to the Y-storing means, for implementing the equation $Y(n) \times 2^{-(n-2)}$ by shifting respective bits of a binary representation of $Y(n)$.

10. The circuit according to claim 9 wherein the cross-arithmetic means further comprises:
    an X-arithmetic means, connected to the Y-shift means and to the X-storing means for implementing the equation $X(n) \pm Y(n) \times 2^{-(n-2)}$ by adding or subtracting a value in the Y-shift means to or from a value in the X-storing means; and
    a Y-arithmetic means, connected to the X-shift means and to the Y-storing means, for implementing the equation $Y(n) \pm X(n) \times 2^{-(n-2)}$ by adding or subtracting a value in the X-shift means to or from a value in the Y-storing means.

11. The circuit according to claim 10 wherein the cross-arithmetic means further comprises:
shift inhibit means, connected to the X-shift means and to the Y-shift means, for inhibiting the shifting of the respective binary values therein for n=1.

12. The circuit according to claim 8 wherein the amplitude storing means comprises an amplitude memory for storing a plurality of amplitude values at addresses therein.

13. The circuit according to claim 12 wherein the increment angle storing means comprises an increment angle memory for storing a plurality of increment angle values at addresses therein.

14. The circuit according to claim 13 wherein the angle storing means comprises an angle memory for storing a plurality of angle values at addresses therein.

15. The circuit according to claim 14 further comprising:
addressing means, connected to the amplitude memory, to the increment angle memory, and to the angle memory, for selecting an amplitude value, an increment angle value and an angle value to be used for each set of N arithmetic and cross-arithmetic operations.

16. The circuit according to claim 15 wherein the addressing means comprises:
an address memory, connected to the amplitude memory, to the increment angle memory and to the angle memory, for selecting an amplitude value, an increment angle value and an angle value to be used for each set of N arithmetic and cross-arithmetic operations; and
a periodic counter, connected to the address memory and to a source of clock pulses, for counting the pulses and for cyclically selecting addresses in the address memory to be communicated to the amplitude memory, to the increment angle memory, and to the angle memory.

* * * * *